United States Patent
Jung et al.

(10) Patent No.: US 9,232,029 B2
(45) Date of Patent: Jan. 5, 2016

(54) DEMULTIPLEXING APPARATUS, MULTIPLEXING APPARATUS, AND MULTI-CHANNEL TRANSMISSION AND RECEPTION METHOD USING THE SAME

(71) Applicant: Electronics and Telecommunications Research Institute, Daejeon (KR)

(72) Inventors: Joon Young Jung, Daejeon (KR); Dong Joon Choi, Daejeon (KR); Nam Ho Hur, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 118 days.

(21) Appl. No.: 14/085,207

(22) Filed: Nov. 20, 2013

(65) Prior Publication Data
US 2014/0211812 A1     Jul. 31, 2014

(30) Foreign Application Priority Data
Jan. 31, 2013    (KR) ........................ 10-2013-0011466

(51) Int. Cl.
| | |
|---|---|
| H04L 29/06 | (2006.01) |
| H04L 25/14 | (2006.01) |
| H04N 21/236 | (2011.01) |
| H04N 21/2381 | (2011.01) |
| H04N 21/2383 | (2011.01) |
| H04N 21/242 | (2011.01) |
| H04N 21/61 | (2011.01) |
| H04N 21/8547 | (2011.01) |

(52) U.S. Cl.
CPC ................ *H04L 69/22* (2013.01); *H04L 25/14* (2013.01); *H04N 21/236* (2013.01); *H04N 21/2381* (2013.01); *H04N 21/2383* (2013.01); *H04N 21/242* (2013.01); *H04N 21/6118* (2013.01); *H04N 21/8547* (2013.01)

(58) Field of Classification Search
None
See application file for complete search history.

(56) References Cited

U.S. PATENT DOCUMENTS

| | | | | |
|---|---|---|---|---|
| 2002/0118680 | A1* | 8/2002 | Lee | 370/389 |
| 2005/0166123 | A1* | 7/2005 | Yanamoto et al. | 714/776 |
| 2007/0074256 | A1* | 3/2007 | Jung et al. | 725/100 |
| 2008/0240155 | A1* | 10/2008 | Cosquer et al. | 370/466 |
| 2009/0180494 | A1 | 7/2009 | Ren et al. | |
| 2009/0288125 | A1* | 11/2009 | Morioka | 725/110 |
| 2010/0158480 | A1* | 6/2010 | Jung et al. | 386/94 |
| 2010/0223477 | A1* | 9/2010 | Onoda et al. | 713/189 |
| 2011/0149826 | A1* | 6/2011 | Choi | 370/312 |
| 2011/0292981 | A1* | 12/2011 | Kihara et al. | 375/224 |
| 2012/0047278 | A1* | 2/2012 | Groos et al. | 709/231 |
| 2012/0278610 | A1* | 11/2012 | Waller | 713/150 |
| 2012/0327955 | A1* | 12/2012 | Herrmann et al. | 370/476 |
| 2014/0211812 | A1* | 7/2014 | Jung et al. | 370/474 |

* cited by examiner

*Primary Examiner* — Benjamin H Elliott, IV (57) ABSTRACT

A demultiplexing apparatus, a multiplexing apparatus, and a multi-channel transmission and reception method using the same are provided. The demultiplexing apparatus includes a broadcasting data reception unit for separating a broadcasting data stream into N input packets, an output packet generation unit for generating (N+1) output packets by connecting a pre-header, including a field for multi-channel transmission, with each of the N input packets, and a packet distribution unit for distributing the (N+1) output packets over at least two channels. The multiplexing apparatus includes a packet restoration unit for detecting first field information for restoration and second field information for synchronization from each of pre-headers included in (N+1) output packets received through at least two channels and generating N restoration packets using the first field information and an output synchronization unit for performing output timing synchronization between the N restoration packets using the second field information.

16 Claims, 9 Drawing Sheets

| Output Packet | Header | Content |
|---|---|---|
| OUTPUT PACKET(PP1) | FIRST PRE-HEADER(400) | 183 BYTES ① OF INPUT PACKET P1 |
| OUTPUT PACKET(PP2) | FIRST PRE-HEADER(400) | 4 BYTES ② OF INPUT PACKET P1 / 179 BYTES ③ OF INPUT PACKET P2 |
| OUTPUT PACKET(PP3) | FIRST PRE-HEADER(400) | 8 BYTES OF INPUT PACKET P2 / 175 BYTES OF INPUT PACKET P3 |
| OUTPUT PACKET(PP4) | FIRST PRE-HEADER(400) | 12 BYTES OF INPUT PACKET P3 / 171 BYTES OF INPUT PACKET P4 |
| ... | | |
| OUTPUT PACKET(PP45) | FIRST PRE-HEADER(400) | 176 BYTES OF INPUT PACKET P44 / 8 BYTES OF INPUT PACKET P45 |
| OUTPUT PACKET(PP46) | FIRST PRE-HEADER(400) | 180 BYTES ④ OF INPUT PACKET P45 / 3 BYTES ⑤ OF INPUT PACKET P46 |
| OUTPUT PACKET(PP47) | SECOND PRE-HEADER(500) | 184 BYTES ⑥ OF INPUT PACKET P46 |

DEMULTIPLEXING APPARATUS, MULTIPLEXING APPARATUS, AND MULTI-CHANNEL TRANSMISSION AND RECEPTION METHOD USING THE SAME

Priority to Korean patent application number 10-2013-0011466 filed on Jan. 31, 2013, the entire disclosure of which is incorporated by reference herein, is claimed.

BACKGROUND OF THE INVENTION

1. Field of the Invention

The present invention relates to a demultiplexing apparatus, a multiplexing apparatus, and a multi-channel transmission and reception method using the same and, more particularly, to a demultiplexing apparatus, a multiplexing apparatus, and a multi-channel transmission and reception method using the same, which transmit and receive a large amount of multimedia data through multiple channels.

2. Discussion of the Related Art

In general, in digital broadcasting, one broadcasting program includes one Moving Pictures Exports Group-2 (MPEG-2) Transport Stream (TS). A TS is a data stream transmitted within one physical channel, and a physical channel capacity means the channel capacity of a Radio Frequency (RF) signal in which a broadcasting signal is transmitted in a transmission system. In Korean and North American broadcasting transmission systems, a physical broadcasting channel has a frequency band of 6 MHz. Terrestrial wave broadcasting has a frequency band of 19.4 Mbps, and cable broadcasting has a maximum channel capacity of 38.8 Mbps.

In High Definition Television (HDTV) service provided in digital broadcasting so far, the amount of data corresponding to one program has not exceeded one physical channel capacity provided by a corresponding transmission system. Recently, in Ultra-High Definition Television (UHDTV) service corresponding to 4 times or 16 times existing HDTV resolution, the amount of data included in one program is significantly increased, thus exceeding one physical channel capacity.

As described above, if the amount of data of an MPEG-2 TS forming one program exceeds a physical channel capacity, multiple channels must be used to send the data. In other words, there is a need for technology in which the transmission side separates one TS into multiple channels and sends the separated streams through the multiple channels and the reception side receives the streams transmitted through the separated multiple channels and configures the received streams into one TS.

PRIOR ART DOCUMENT

Patent Document (Patent Document 1) Korean Patent Registration No 0688089 entitled 'APPARATUS FOR MULTIPLEXING AND DEMULTIPLEXING IN CABLE TV RECEIVER by ETRI on Feb. 22, 2007

SUMMARY OF THE INVENTION

An object of the present invention is to provide a demultiplexing apparatus, a multiplexing apparatus, and a multi-channel transmission and reception method using the same, which provide information about the order and timing of MPEG-2 TS packets by adding a pre-header for rearranging the MPEG-2 TS packets transmitted through respective channels and minimizing transmission jitter between the MPEG-2 TS packets when sending a large amount of multimedia data, such as UHDTV, through the multiple channels not one channel due to a limited physical channel capacity of a transport channel.

Technical objects to be achieved by the present invention are not limited to the aforementioned object, and other technical objects that have not been described above will become evident to those skilled in the art to which the present invention pertains from the following description.

An embodiment of the present invention relates to a demultiplexing apparatus, including a broadcasting data reception unit for separating a broadcasting data stream into N input packets, an output packet generation unit for generating (N+1) output packets by connecting a pre-header, including a field for multi-channel transmission, with each of the N input packets, and a packet distribution unit for distributing the (N+1) output packets over at least two channels.

The pre-headers include a first pre-header and a second pre-header, the first pre-header includes a packet number field including information for packet rearrangement and a time stamp field including information for output timing synchronization between packets, and the second pre-header includes a packet number field.

The pre-header further includes a sync byte field, a transport error indicator field, a payload unit start indicator field, a transport priority field, and a packet identifier field.

The output packet generation unit generates output packets, placed up to an $N^{th}$ position in the (N+1) output packets, using the first pre-header and generates an $(N+1)^{th}$ output packet using the second pre-header.

The output packet generation unit generates a first output packet by connecting the first pre-header with the first input region of an $i^{th}$ input packet (i=1) of the N input packets and generates an $(i+1)^{th}$ output packet by connecting the first input region of the $(i+1)^{th}$ input packet with the second input region connected subsequently to the first input region of the $i^{th}$ input packet (1≤i<N) of the N input packets and then connecting the first pre-header with the connected result.

The output packet generation unit generates the $(N+1)^{th}$ output packet by connecting the second pre-header with the second input region connected subsequently to the first input region of an $i^{th}$ input packet (i=N) of the N input packets.

The packet distribution unit distributes the (N+1) output packets over modulators corresponding to the respective at least two channels.

Another embodiment of the present invention relates to a multi-channel transmission method of a demultiplexing apparatus, including separating a broadcasting data stream into N input packets, generating (N+1) output packets by connecting a pre-header, including a field for multi-channel transmission, with each of the N input packets, and distributing the (N+1) output packets over at least two channels.

The pre-headers include a first pre-header and a second pre-header, the first pre-header includes a packet number field including information for packet rearrangement and a time stamp field including information for output timing synchronization between packets, and the second pre-header includes a packet number field.

Generating the (N+1) output packets includes generating output packets, placed up to an $N^{th}$ position in the (N+1) output packets, using the first pre-header and generating an $(N+1)^{th}$ output packet using the second pre-header.

Generating the output packets, placed up to the $N^{th}$ position in the (N+1) output packets, using the first pre-header includes generating a first output packet by connecting the first pre-header with the first input region of an $i^{th}$ input packet (i=1) of the N input packets and generating an (i+1)$^{th}$ output packet by connecting the first input region of the (i+1)$^{th}$ input packet with the second input region connected subsequently to the first input region of the i$^{th}$ input packet (1≤i<N) of the N input packets and then connecting the first pre-header with the connected result.

Generating the (N+1)$^{th}$ output packet using the second pre-header includes generating the (N+1)$^{th}$ output packet by connecting the second pre-header with the second input region connected subsequently to the first input region of an i$^{th}$ input packet (i=N) of the N input packets.

Yet another embodiment of the present invention relates to a multiplexing apparatus, including a packet restoration unit for detecting first field information for restoration and second field information for synchronization from each of pre-headers included in (N+1) output packets received through at least two channels and generating N restoration packets using the first field information and an output synchronization unit for performing output timing synchronization between the N restoration packets using the second field information.

The first field information is a value of a packet number field including information for packet rearrangement, and the second field information is a value of a time stamp field for output timing synchronization between packets.

The packet restoration unit rearranges the (N+1) output packets received through the at least two channels using the first field information.

The packet restoration unit generates a first restoration packet by connecting the first output region of an output packet having the first field information of i (i=1), from among the (N+1) output packets, with the first output region of an output packet having the first field information of (i+1) and connecting a sync byte field with the connection results, and the packet restoration unit generates an i$^{th}$ restoration packet by connecting the second output region connected to the first output region of an output packet having the first field information of i (1<i<(N+1)), from among the (N+1) output packets, with the first output region of the output packet having the first field information of (i+1) and connecting a sync byte field with the connection results.

Yet further another embodiment of the present invention relates to a multi-channel reception method of a multiplexing apparatus, including receiving (N+1) output packets through at least two channels, detecting first field information for restoration and second field information for synchronization from each of pre-headers included in the (N+1) output packets, generating N restoration packets using the first field information, and performing output timing synchronization between the N restoration packets using the second field information.

The first field information is a value of a packet number field including information for packet rearrangement, and the second field information is a value of a time stamp field for output timing synchronization between packets.

Generating N restoration packets using the first field information includes rearranging the (N+1) output packets received through the at least two channels using the first field information.

Generating N restoration packets using the first field information includes generating a first restoration packet by connecting the first output region of an output packet having the first field information of i (i=1), from among the (N+1) output packets, with the first output region of an output packet having the first field information of (i+1) and connecting a sync byte field with the connection results and generating an i$^{th}$ restoration packet by connecting the second output region connected to the first output region of an output packet having the first field information of i (1<i<(N+1)), from among the (N+1) output packets, with the first output region of the output packet having the first field information of (i+1) and connecting a sync byte field with the connection results.

DETAILED DESCRIPTION OF THE EMBODIMENTS

The present invention may be modified in various ways and may be implemented to have several embodiments. Specific embodiments of the present invention are illustrated in the drawings and are described in detail in the detailed description.

It is however to be noted that the present invention is not intended to be limited to the specific embodiments, but is intended to include all modifications, equivalents, or substitutions which fall within the spirit and technical scope of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term 'and/or' includes a combination of a plurality of pertinent and described items or any one of a plurality of pertinent and described items.

When it is said that one element is 'connected' or 'coupled' with the other element, it should be understood that one element may be directly connected or coupled with the other element, but a third element may exist between the two elements. In contrast, when it is said that one element is 'directly connected' or 'directly coupled' with the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as 'comprise' or 'have', are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All terms used herein, including technical or scientific terms, have the same meanings as those that are typically understood by those skilled in the art, unless otherwise defined. Terms, such as ones defined in common dictionaries, should be constructed as having the same meanings as those in the context of related technology and should not be constructed as having ideal or excessively formal meanings, unless clearly defined in the specification.

Hereinafter, some exemplary embodiments of the present invention are described in detail with reference to the accompanying drawings. In describing the present invention, in order to help general understanding, the same reference numerals designate the same elements throughout the drawings and a redundant description of the same elements is omitted.

Figure 1:
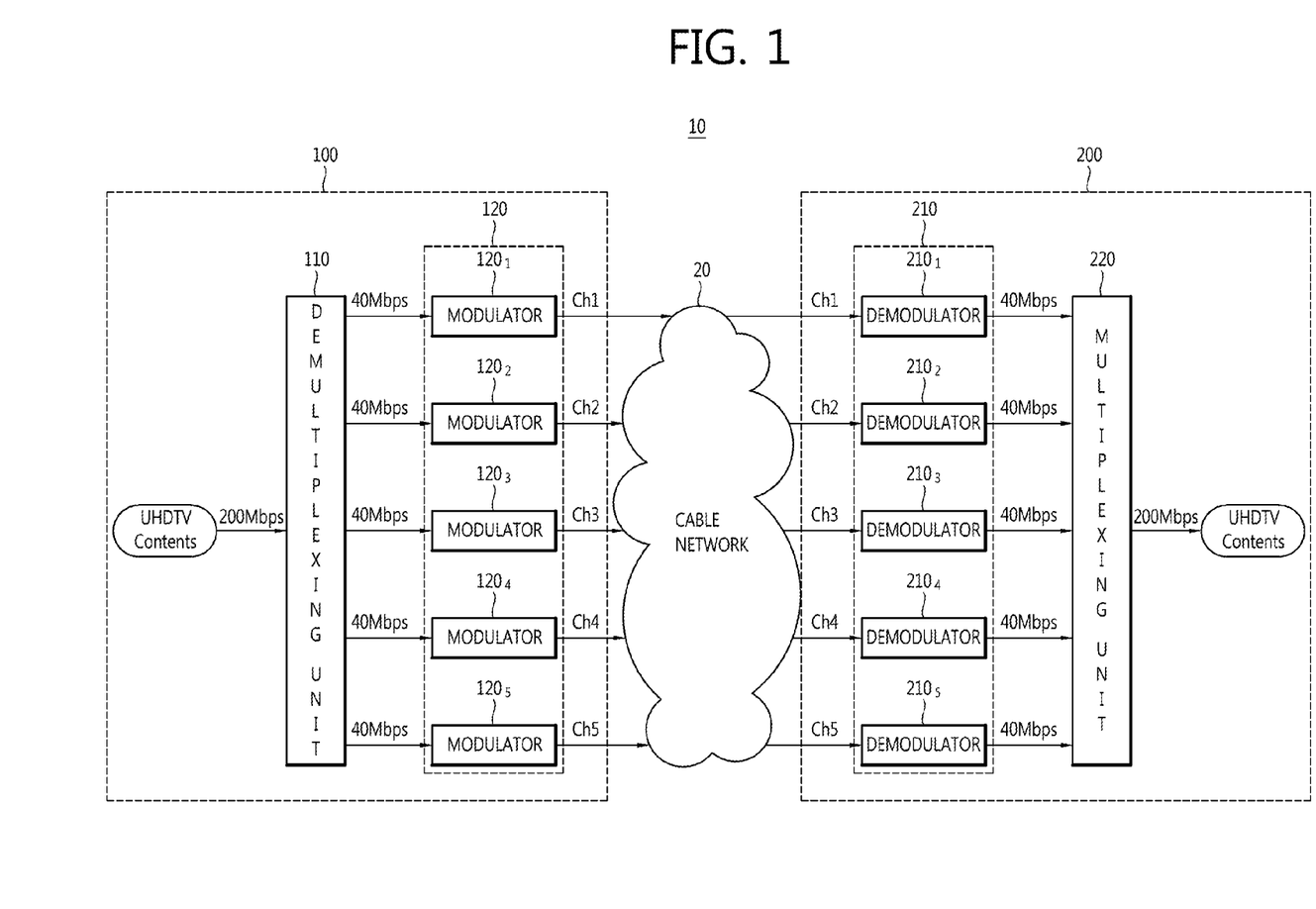
FIG. 1 is a diagram schematically showing a digital broadcasting system for describing multi-channel transmission in accordance with an embodiment of the present invention.

FIG. 1 is a diagram schematically showing a digital broadcasting system for describing multi-channel transmission in accordance with an embodiment of the present invention.

As shown in FIG. 1, the digital broadcasting system 10 for describing multi-channel transmission in accordance with an embodiment of the present invention includes a broadcasting transmission apparatus 100 and a broadcasting reception apparatus 200. In an embodiment of the present invention, it is assumed that the number of modulators used in the broadcasting transmission apparatus 100 is 5 and demodulators used in the broadcasting reception apparatus 200 is 5, for convenience of description.

The broadcasting transmission apparatus 100 is placed at the head end and configured to provide Ultra High Definition Television (UHDTV) service. This broadcasting transmission apparatus 100 includes a demultiplexing unit 110 and a modulation unit 120 in order to transport UHDTV data having a transfer rate of 200 Mbps, such as UHDTV content. The modulation unit 120 includes five modulators $120_1$ to $120_5$.

The demultiplexing unit 110 receives a UHDTV data stream of 200 Mbps and separates the UHDTV data stream into five 40-Mbps data streams. Here, the data stream is a Moving Pictures Exports Group-2 Transport Stream (MPEG-2 TS), and the five MPEG-2 TS packets of the separated data streams are sequentially distributed over the respective channels ch1-ch5. Furthermore, the separated 40-Mbps data streams are inputted to the modulators $120_1$ to $120_5$ corresponding to the channels ch1-ch5, modulated into the signals of the respective channels, and then transmitted over a cable network 20.

The broadcasting reception apparatus 200 receives UHDTV service from the broadcasting transmission apparatus 100 through the channels ch1-ch5. In other words, the broadcasting reception apparatus 200 receives the 40-Mbps data streams that have been separated into the respective channels ch1-ch5 and then transmitted. This broadcasting reception apparatus 200 includes a demodulation unit 210 and a multiplexing unit 220. The demodulation unit 210 includes 5 demodulators $210_1$ to $210_5$. In accordance with an embodiment of the present invention, the broadcasting reception apparatus 200 includes demodulators equal to the number of channels in order to receive the 40-Mbps data streams that have been separated into the respective channels ch1-ch5 and then transmitted.

The demodulators $210_1$ to $210_5$ receive signals transferred through the respective channels ch1-ch5 over the cable network 20 and demodulate the receive signals. The 40-Mbps data streams corresponding to the respective channels ch1-ch5, demodulated by the demodulators $210_1$ to $210_5$ and then outputted, are inputted to the multiplexing unit 220, multiplexed into one 200-Mbps data stream, and then outputted.

The modulators $120_1$ to $120_5$ and the demodulators $210_1$ to $210_5$ used for digital broadcasting transmission in accordance with an embodiment of the present invention receive and output MPEG-2 TS packets. In other words, an input interface for the modulators $120_1$ to $120_5$ and an output interface for the demodulators $210_1$ to $210_5$ are regulated by an MPEG-2 TS. Here, the MPEG-2 TS is a string of MPEG-2 TS packets having 188 bytes.

If an MPEG-2 TS is separated and transmitted through several channels as described above, separated MPEG-2 TS packets are distributed over several channels and transmitted. The reception side needs to collect the MPEG-2 TS packets distributed over and transmitted through several channels and to rearrange the collected MPEG-2 TS packets according to the original packet order. Here, the MPEG-2 TS packets include a packet including a Program Clock Reference (PCR), that is, timing information necessary to restore compressed content. The packet including the PCR needs to have transmission jitter of 500 nanoseconds or less. Furthermore, the reception side needs to maintain the original packet transport time interval when rearranging and outputting the MPEG-2 TS packets.

Figure 2:
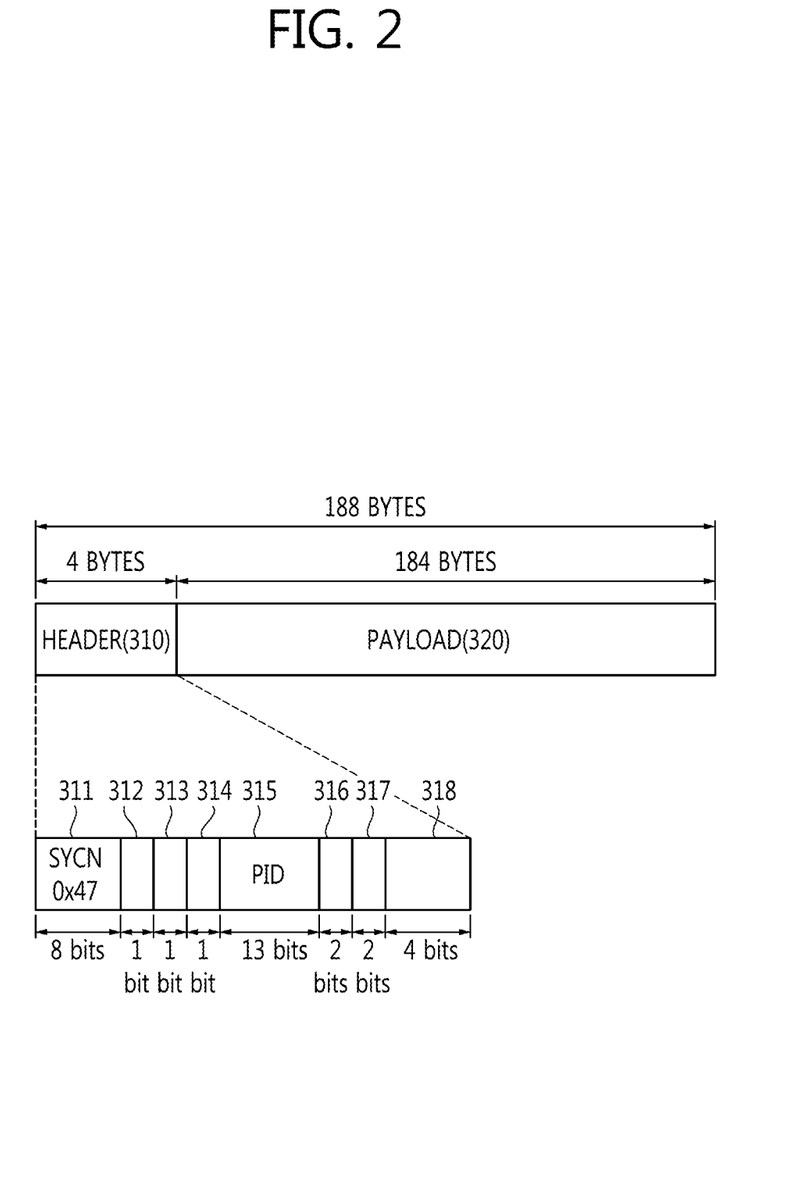
FIG. 2 is a diagram schematically showing the structure of a common MPEG-2 TS packet.

FIG. 2 is a diagram schematically showing the structure of a common MPEG-2 TS packet.

Referring to FIGS. 1 and 2, the common MPEG-2 TS packet 300 consists of 188 bytes and includes a header 310 and a payload 320.

The header 310 consists of 4 bytes of the 188 bytes. The header 310 includes a sync byte (311) field, a transport error indicator (312) field, a payload unit start indicator (313) field, a transport priority (314) field, a packet identifier (PID) (315) field, a transport scrambling control (316) field, a adaptation field control (317) field, and a continuity counter (318) field.

The sync byte 311 of the header 310 is used for the synchronization of the MPEG-2 TS packet, and the sync byte 311 has a fixed value of '0x47'. In order to send an MPEG-2 TS packet, a modulator must be able to find the start of the MPEG-2 TS packet. Here, a sync byte is used. Furthermore, when a demodulator processes a received signal and finally outputs each MPEG-2 TS packet, the demodulator checks whether or not the MPEG-2 TS packet includes an error in transmission. If, as a result of the check, the MPEG-2 TS packet has an error, the transport error indicator bit 312 is set to '1'. If, as a result of the check, the MPEG-2 TS packet does not have an error, the transport error indicator bit 312 is set to '0'. In other words, in the modulator for sending an MPEG-2 TS packet and the demodulator for receiving an MPEG-2 TS packet, the sync byte 311 and the transport error indicator bit 312 of the 4-byte header 310 of the MPEG-2 TS packet are used.

As described above, in an embodiment of the present invention, when sending UHDTV data, such as UHDTV content, the transmission side separates one MPEG-2 TS into MPEG-2 TS packets and sends the separated MPEG-2 TS packets through at least two channels, and the reception side multiplexes the MPEG-2 TS packets, received through the respective channels, into one MPEG-2 TS and outputs the one MPEG-2 TS. Accordingly, packet order rearrangement and packet output timing synchronization must be performed.

As described above, if an MPEG-2 TS is separated into MPEG-2 TS packets and transmitted through several channels, the reception side must sequentially rearrange the MPEG-2 TS packets and output the rearranged MPEG-2 TS packets according to the original time interval between the MPEG-2 TS packets. It is however difficult to sequentially rearrange MPEG-2 TS packets based on only information included in the conventional MPEG-2 TS packet of FIG. 2 and to maintain a time interval between the MPEG-2 TS packets as original. In other words, since an MPEG-2 TS has been basically standardized assuming that the MPEG-2 TS is transmitted through one channel, the rearrangement of packets and packet output timing synchronization have not been taken into consideration.

In order to solve the problems, in an embodiment of the present invention, a pre-header including a field for multi-channel transmission is applied to an MPEG-2 TS packet. In this case, although an MPEG-2 TS is separated into packets and the separated packets are transmitted through several channels, the reception side can sequentially rearrange the packets and perform output timing synchronization between the packets as original. This method is described in detail with reference to FIGS. 3 to 9.

Figure 3:
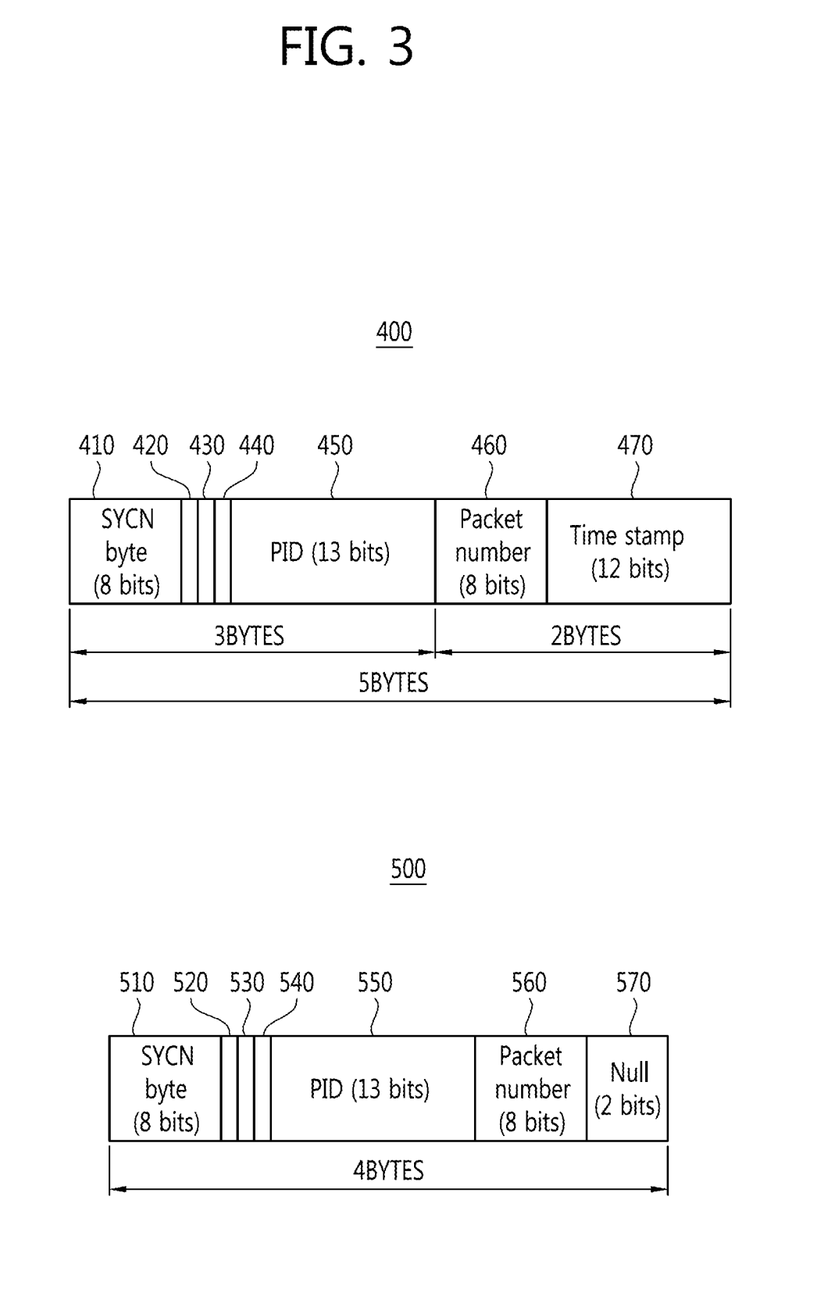
FIG. 3 is a diagram schematically showing the structure of a pre-header in accordance with an embodiment of the present invention.

FIG. 3 is a diagram schematically showing the structure of a pre-header in accordance with an embodiment of the present invention.

As shown in FIG. 3, a pre-header in accordance with an embodiment of the present invention has two types.

First, a first pre-header 400, that is, the first type, consist of 5 bytes.

Particularly, 3 bytes of the 5 bytes of the first pre-header 400 are the same as the 3 bytes of the header 310 of the MPEG-2 TS packet shown in FIG. 2. That is, the sync byte (410) field, the transport error indicator (420) field, the payload unit start indicator (430) field, the transport priority (440) field, and the packet identifier (450) field of the first pre-header 400 are the same as those of the header 310 of the conventional MPEG-2 TS packet.

Unlike the header 310 of the conventional MPEG-2 TS packet, the first pre-header 400 further includes a packet number (460) field and a time stamp (470) field in the remaining 2 bytes of the 5 bytes. Here, the packet number (460) field includes information for packet rearrangement, and the time stamp (470) field includes information for output timing synchronization between packets.

Next, a second pre-header 500, that is, the second type, consists of 4 bytes.

Particularly, unlike the first pre-header 400, the second pre-header 500 includes a packet number (560) field, but does not include a time stamp field. In other words, the second pre-header 500 includes a sync byte (510) field, a transport error indicator (520) field, a payload unit start indicator (530) field, a transport priority (540) field, a packet identifier (550) field, a packet number (560) field, and a null (570) field.

Figure 4:
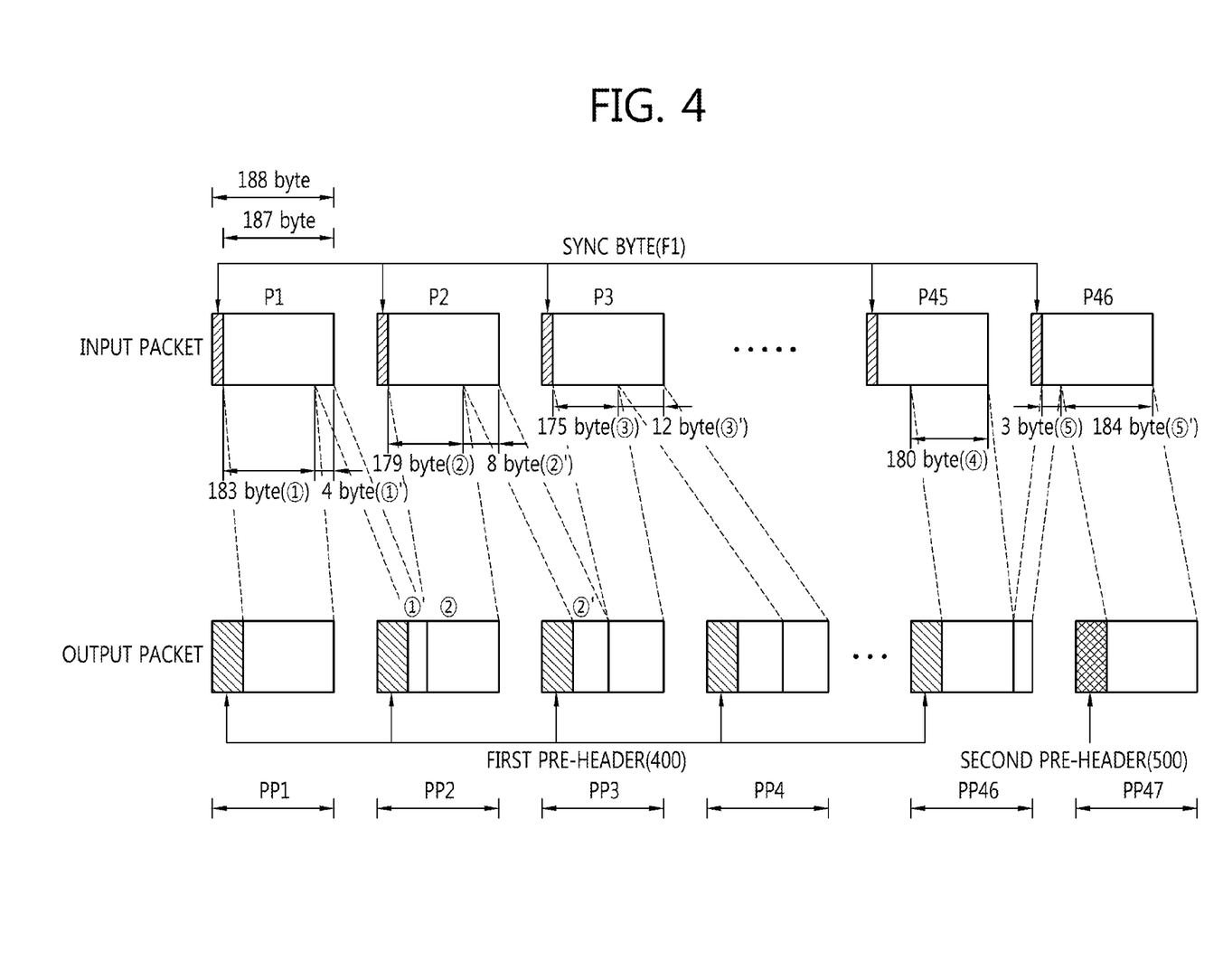
FIG. 4 is a diagram schematically showing a method of transmitting an MPEG-2 TS using the pre-header in accordance with an embodiment of the present invention.
Figure 5:
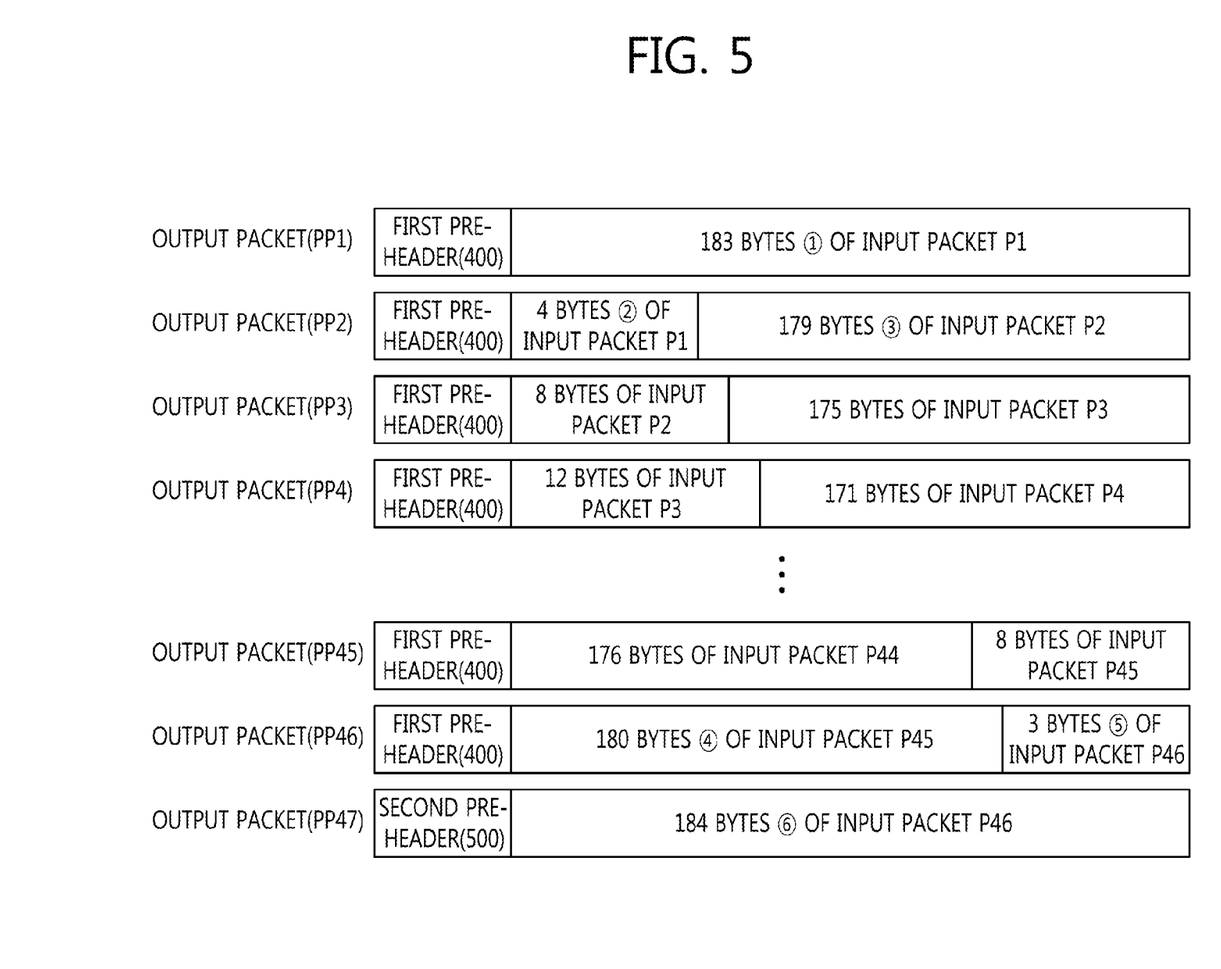
FIG. 5 is a diagram showing a detailed construction of an MPEG-2 TS packet using the pre-header in accordance with an embodiment of the present invention.

FIG. 4 is a diagram schematically showing a method of transmitting an MPEG-2 TS using the pre-header in accordance with an embodiment of the present invention. FIG. 5 is a diagram showing a detailed construction of an MPEG-2 TS packet using the pre-header in accordance with an embodiment of the present invention.

Referring to FIGS. 4 and 5, the demultiplexing unit 110 in accordance with an embodiment of the present invention receives a UHDTV data stream and separates the received UHDTV data stream into 46 MPEG-2 TS packets P1 to P46 (hereinafter referred to as 'input packets'). The demultiplexing unit 110 outputs 47 MPEG-2 TS packets PP1 to PP47 (hereinafter referred to as 'output packets') by applying first and second pre-headers 400 and 500 to the 46 separated MPEG-2 TS packets P1 to P46. Here, in each of the input packets P1 to P46, the pre-header 400, 500 is applied to 187 bytes from which a sync byte field F1 of 1 byte, having a fixed value '0x47' has been removed, from among 188 bytes, thereby generating the output packets PP1 to PP47.

The input packets P1 to P46, each having 188 bytes from which the sync byte field F1 has been removed, in accordance with an embodiment of the present invention are classified into first input regions (e.g., ①, ②, ③, ④, and ⑤) and second input regions (e.g., ①', ②', ③', ④', and ⑤') and are used to generate the output packets PP1 to PP47. Here, a region directly connected to the sync byte field F1, from among the remaining byte regions other than the sync byte field F1 in the input packet, is defined as the first input region, and a region connected subsequently to the first input region is defined as the second input region.

First, the demultiplexing unit 110 generates the first output packet PP1 by connecting upper 183 bytes (① first input region), from among the remaining 188 bytes from which the sync byte field F1 of the input packet P1 has been removed, with the first pre-header 400. Furthermore, the demultiplexing unit 110 generates the second output packet PP2 by connecting the remaining 4 bytes (①' second input region) of the input packet P1 with upper 179 bytes (② first input region) of the second input packet P2 and then connecting the results with the first pre-header 400.

Likewise, the demultiplexing unit 110 generates the output packets PP3 to PP46 by connecting the first pre-header 400 with each of the remaining input packets P3 to P45. Here, lower 180 bytes (④' second input region) of the input packet P45 are connected with upper 3 bytes (⑤ first input region) of the input packet P46, thus generating the output packet PP46. Finally, the demultiplexing unit 110 generates the output packet PP47 by connecting the second pre-header 500 with the remaining 184 bytes (⑤' second input region) of the input packet P46.

As described above, when generating the 47 output packets PP1 to PP47 by applying the pre-headers 400 and 500 to the 46 input packets P1 to P46, a field value applied to each of the pre-headers 400 and 500 is as follows [refer to FIG. 3].

The sync byte field 410, 510 always has a fixed value of '0x47'.

The transport error indicator field 420, 520 always has a value of 0.

The payload unit start indicator field 430, 530 indicates whether or not a start point at which actual transmission is started is present in each of the output packets PP1 to PP47. The payload unit start indicator field 430, 530 has a value of 1 when the output packets PP1-PP46 are generated and has a value of 0 when the output packet PP47 is generated. That is, since each of the output packets PP1-PP46 has an input packet connected thereto and started, the payload unit start indicator field 430 of each of the output packets PP1-PP46 has a value of 1. Since the output packet PP47 does not have an input packet connected thereto and started, the unit start indicator field 430 of the output packet PP47 has a value of 0.

The transport priority field 440, 540 has a value of 0 or 1 depending on a transport environment. Here, when the transport priority field 440, 540 has a value of 1, it means that a corresponding packet is transmitted earlier than other packets of another program.

The packet identifier field 450, 550 is used to identify MPEG-2 TS packets. Since the broadcasting transmission apparatus 100 and the broadcasting reception apparatus 200 use a pre-arranged packet identifier (PID) value, programs can be distinguished from each other although they are mixed.

The packet number field 460, 560 is increased by 1 from 1 to 47 whenever each of the 47 output packets PP1 to PP47 is generated. Furthermore, after the packet number field 460, 560 is increased up to 47, the packet number field 460, 560 is increased from 1 again. Here, in the packet number field 460, 560, a value of 0 is not permitted. That is, the packet number field 460, 560 indicates a packet number from the first output packet PP1 to the 47$^{th}$ output packet PP47.

The time stamp field 470 is a 12-bit counter value for a 27 MHz clock and used to record a counter value corresponding to a point of time at which a packet is received. That is, since the output packets PP1-PP46 include the starts of the input packets P1 to P46, the time when a corresponding input packet is received is recorded. However, the time stamp field 470 is not applied to the output packet PP47 because the output packet PP47 does not include the start of an input packet.

Figure 6:
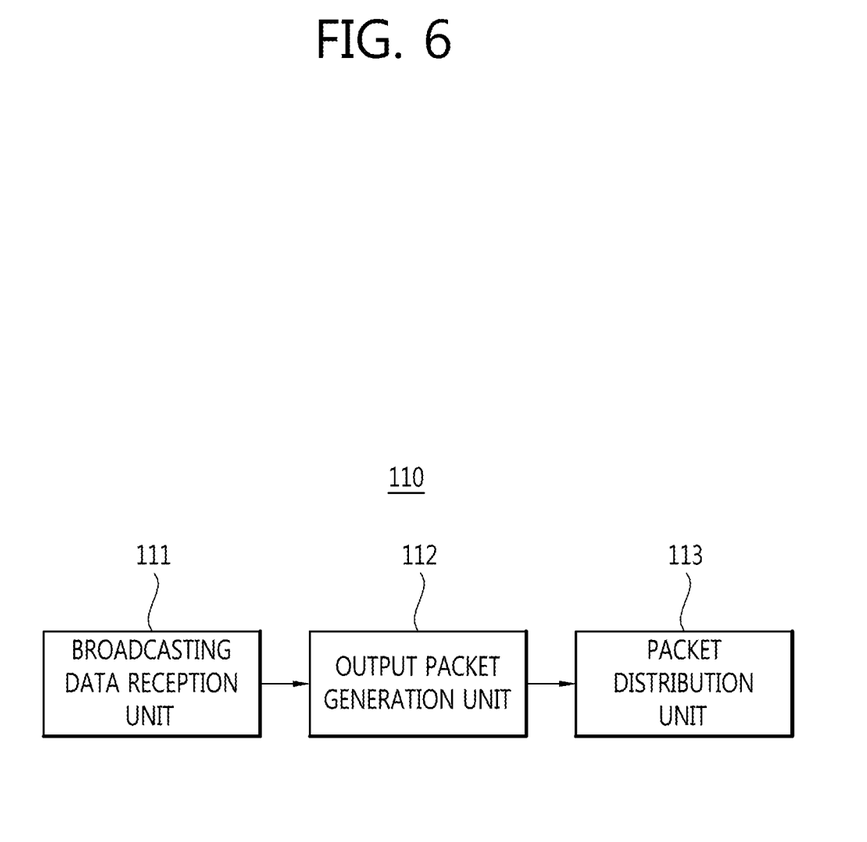
FIG. 6 is a diagram schematically showing the construction of a demultiplexing unit in accordance with an embodiment of the present invention.

FIG. 6 is a diagram schematically showing the construction of the demultiplexing unit 110 in accordance with an embodiment of the present invention.

Referring to FIGS. 4 and 6, the demultiplexing unit 110 of the broadcasting transmission apparatus 100 in accordance with an embodiment of the present invention includes a broadcasting data reception unit 111, an output packet generation unit 112, and a packet distribution unit 113.

The broadcasting data reception unit 111 receives a UHDTV data stream. Furthermore, the broadcasting data reception unit 111 separates the received UHDTV data stream into MPEG-2 TS packets. The broadcasting data reception unit 111 transfers the separated MPEG-2 TS packets, that is, the input packets P1 to P46, to the output packet generation unit 112.

The output packet generation unit 112 removes the sync byte field F1 from each of the input packets P1 to P46. Furthermore, the output packet generation unit 112 generates the 47 output packets PP1 to PP47 using the 46 input packets P1 to P46 and the first and the second pre-headers 400 and 500. In other words, the output packet generation unit 112 generates the output packets PP1-PP46 using the input packets P1 to P45 and the first pre-header 400. The output packet generation unit 112 generates the output packet PP47 using the input packet P46 and the second pre-header 500. The output packet generation unit 112 transfers the output packets PP1 to PP47 to the packet distribution unit 113. A detailed process of generating the output packets PP1 to PP47 by applying the pre-headers 400 and 500 to the input packets P1 to P45 and the input packet P46 in accordance with an embodiment of the present invention is described later.

The packet distribution unit 113 receives the output packets PP1 to PP47 from the output packet generation unit 112. The packet distribution unit 113 distributes the output packets PP1 to PP47 into the channels ch1-ch5 and transfers the distributed output packets PP1 to PP47 to the modulators $120_1$ to $120_5$.

Figure 7:
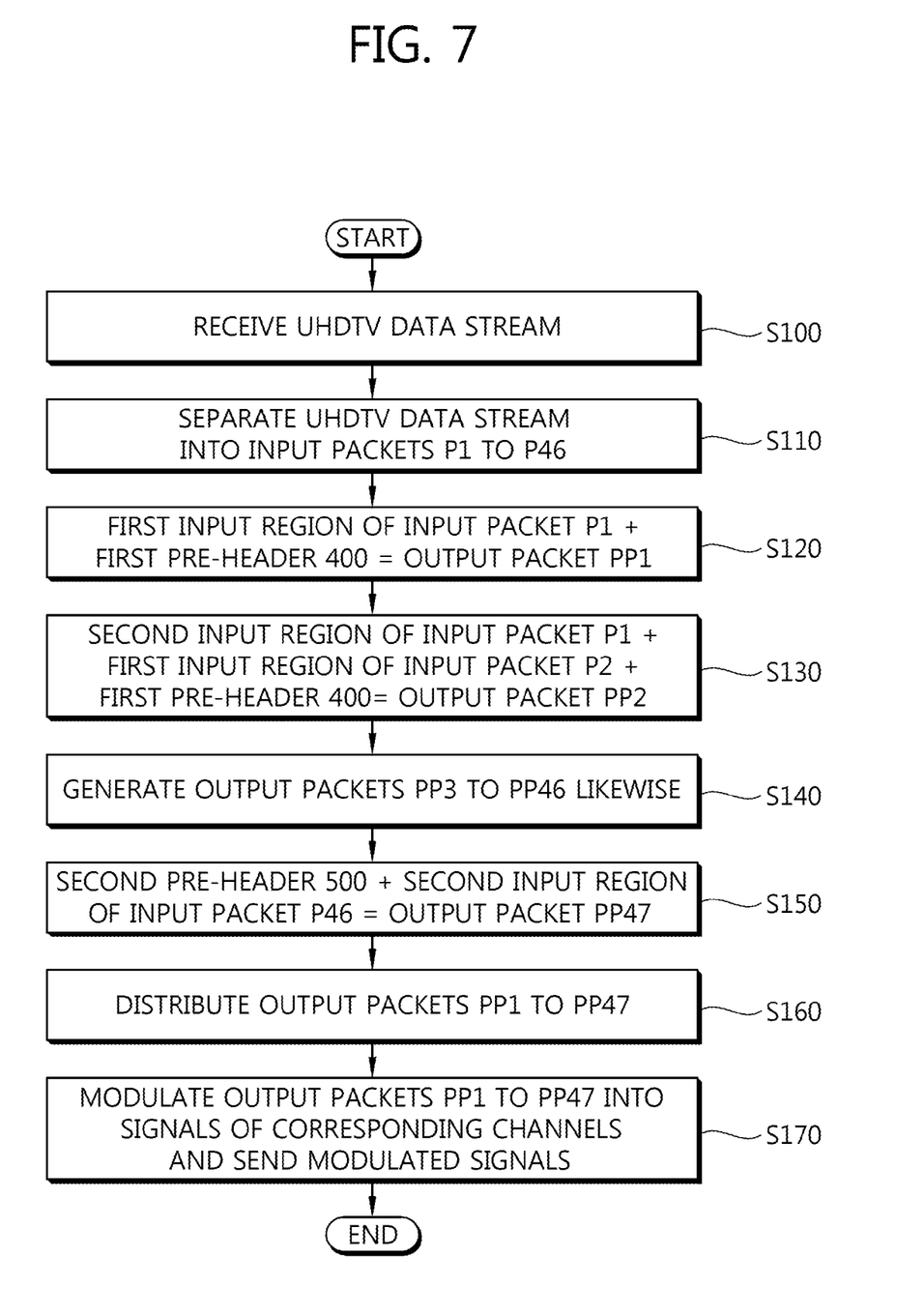
FIG. 7 is a flowchart illustrating a method of a broadcasting transmission apparatus sending UHDTV data through multiple channels in accordance with an embodiment of the present invention.

FIG. 7 is a flowchart illustrating a method of the broadcasting transmission apparatus transporting UHDTV data through multiple channels in accordance with an embodiment of the present invention. In FIG. 7, it is assumed that the broadcasting transmission apparatus 100 includes the demultiplexing unit 110 and the five modulators $120_1$ to $120_5$ as shown in FIG. 1, a UHDTV data stream is separated into the 46 input packets P1 to P46, and the 47 output packets PP1 to PP47 are generated by applying pre-headers including fields for multi-channel transmission to the 46 input packets P1 to P46.

Referring to FIGS. 1, 4, 6, and 7, in the broadcasting transmission apparatus 100 in accordance with an embodiment of the present invention, the broadcasting data reception unit 111 of the demultiplexing unit 110 receives a UHDTV data stream at step S100. The broadcasting data reception unit 111 separates the UHDTV data stream into the input packets P1 to P46 at step S110.

The output packet generation unit 112 removes the sync byte field F1 from the input packet P1. The output packet generation unit 112 generates the output packet PP1 by connecting the first input region of the remaining 188 bytes of the input packet P1 with the first pre-header 400 at step S120. The output packet generation unit 112 generates the output packet PP2 by connecting the remaining second input region of the input packet P1 with the first input region of the input packet P2 and then connecting the results with the first pre-header 400 at step S130.

Likewise, the output packet generation unit 112 generates the output packets PP3 to PP46 by connecting the first pre-header 400 with each of the remaining input packets P3 to P45 at step S140. Here, the second input region of the input packet P45 is connected with the first input region of the input packet P46, thereby generating the output packet PP46. The output packet generation unit 112 generates the output packet PP47 by connecting the second pre-header 500 with the second input region of the input packet P46 at step S150.

The packet distribution unit 113 distributes the output packets PP1 to PP47 over the channels ch1-ch5 at step S160.

The output packets PP1 to PP47 distributed over the channels ch1-ch5 are inputted to the modulators $120_1$ to $120_5$ corresponding to the respective channels. The modulators $120_1$ to $120_5$ modulate the output packets PP1 to PP47 into the signals of the corresponding channels and send the modulated signals to the broadcasting reception apparatus 200 over the cable network 20 at step S170.

Figure 8:
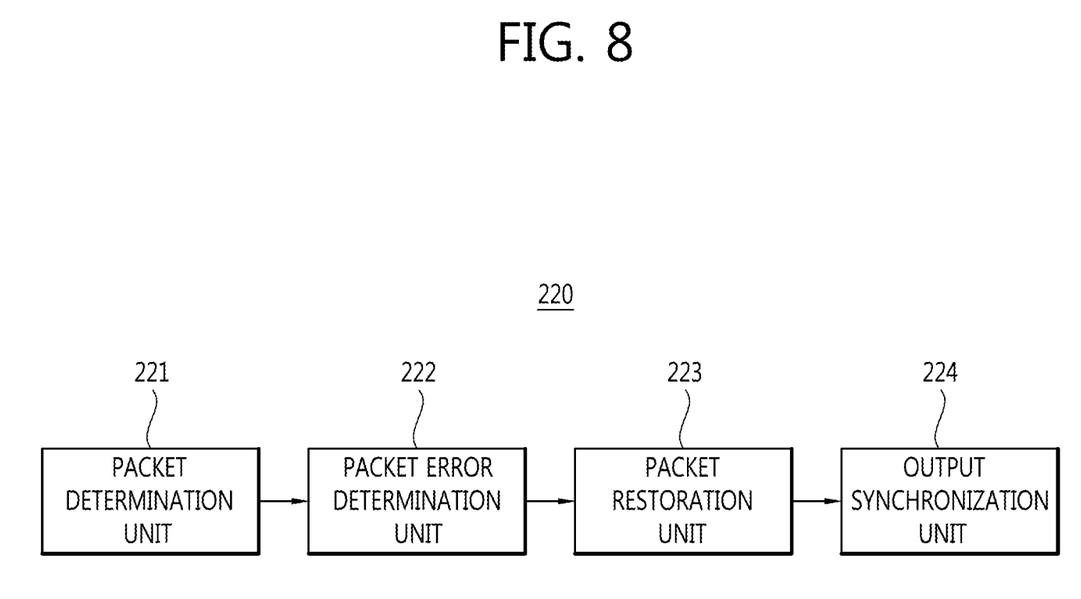
FIG. 8 is a diagram schematically showing the construction of a multiplexing unit in accordance with an embodiment of the present invention.

FIG. 8 is a diagram schematically showing the construction of the multiplexing unit 220 in accordance with an embodiment of the present invention.

Referring to FIGS. 1, 4, and 8, the multiplexing unit 220 in accordance with an embodiment of the present invention includes a packet determination unit 221, a packet error determination unit 222, a packet restoration unit 223, and an output synchronization unit 224.

The packet determination unit 221 receives the output packets PP1 to PP47 from the demodulators $210_1$ to $210_5$. The packet determination unit 221 determines whether or not a value of the packet identifier field 450, 550 in each pre-header of the output packets PP1 to PP47 is a pre-arranged value and transfers a corresponding field having the pre-arranged value to the packet error determination unit 222. Here, it is assumed that the value of the packet identifier field 450, 550 has been previously agreed between the broadcasting transmission apparatus 100 and the broadcasting reception apparatus 200. If, as a result of the determination, it is determined that a value of the packet identifier field 450, 550 is not a pre-arranged value, the packet determination unit 221 considers the output packets to be packets transferred from another program and does not transfer the output packets.

The packet error determination unit 222 determines whether or not a transport error has occurred because the transport error indicator field 440, 540 in each pre-header of the output packets PP1 to PP47 received from the packet determination unit 221 becomes '0'. The packet error determination unit 222 transfers the output packets PP1 to PP47 not having a transport error to the packet restoration unit 223. Meanwhile, the packet error determination unit 222 neglects an output packet having a transport error because the transport error indicator field 440, 540 becomes '1'.

The packet restoration unit 223 receives the output packets PP1 to PP47 not having a transport error from the packet error determination unit 222. The packet restoration unit 223 detects values of the packet number fields 460 and 560 and the time stamp field 470 in the pre-headers of the output packets PP1 to PP47 not having a transport error. Furthermore, the packet restoration unit 223 rearranges the output packets PP1 to PP47, transferred to the channels ch1-ch5, using the packet number fields 460 and 560 of the output packets PP1 to PP47. The packet restoration unit 223 generates the 46 input packets P1 to P46, that is, the restoration packets P1 to P46, using the rearranged output packets PP1 to PP47.

For example, if a value of the packet number field in the rearranged output packets PP1 to PP47 is '2' or '3', the packet restoration unit 223 removes the first pre-header 400 of the output packet PP2 having '2' as a value of the packet number field. Furthermore, the packet restoration unit 223 removes the second input region ①' of the input packet P1 connected to the first pre-header 400 of the output packet PP2, that is, the first output region and then connects the remaining second output region ② with the sync byte field F1 (i.e., F1+②). Furthermore, the packet restoration unit 223 removes the first pre-header 400 of the output packet PP3 having '3' as a value of the packet number field and connects the first output region ②', connected with the first pre-header 400 of the output packet PP3, with the connection result (i.e., F1+②), thereby restoring the input packet (i.e., P2=F1+②+②').

In accordance with an embodiment of the present invention, a region directly connected with the pre-header of an output packet, from the remaining byte region other than the first pre-header 400 or the second pre-header 500, is defined as the first output region, and a region connected subsequently to the first output region is defined as the second output region.

Furthermore, the packet restoration unit 223 transfers the restored output packets PP1 to PP47 and values of the time stamp fields 470 to the output synchronization unit 224. Rearrangement in accordance with an embodiment of the present invention is performed whenever the output packets PP1 to PP47 are inputted to the channels ch1-ch5. If an error is present in a packet or a packet is lost, demodulation is performed after a wait for the reception of a corresponding packet for a specific time.

The output synchronization unit 224 synchronizes the output time intervals of the restoration packets P1 to P46, that is, output timing synchronization between the restoration packets P1 to P46, using the values of the time stamp fields 470. In other words, when generating the restoration packets P1 to P46, values of the time stamp fields 470 for the restoration packets P1 to P46 are recorded. After the first restoration packet is outputted, a next restoration packet is outputted after a wait corresponding to a difference between a value of the stamp field 470 of a previously outputted restoration packet and a value of the stamp field 470 of a restoration packet to be output next. Each of the remaining restoration packets is outputted after a wait corresponding to a difference between a value of the stamp field 470 of a previously outputted restoration packet and a value of the stamp field 470 of a restoration packet to be output next. To this end, a counter operating at a 27-MHz clock needs to be referred in the broadcasting reception apparatus 200.

Figure 9:
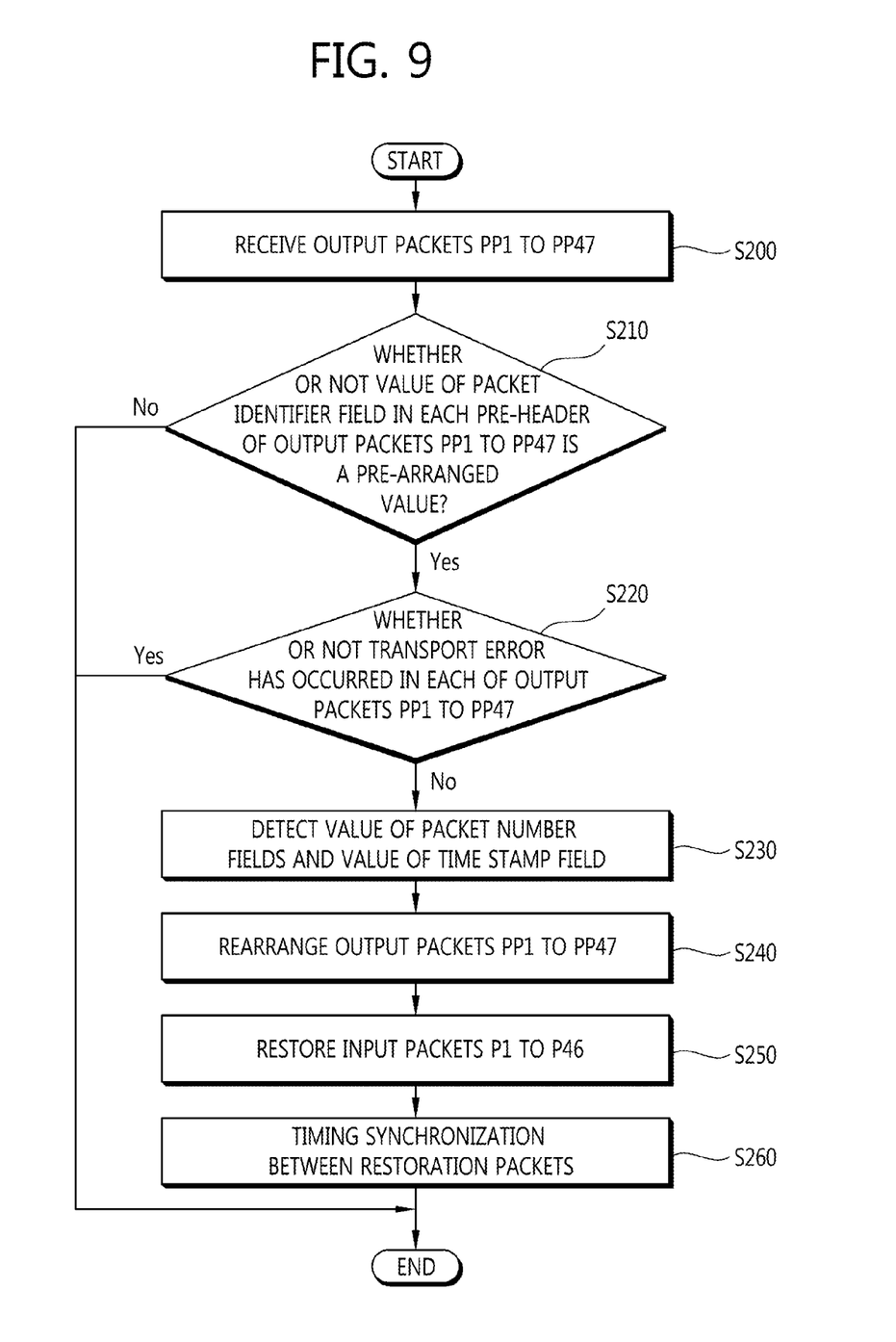
FIG. 9 is a flowchart illustrating a method of a broadcasting reception apparatus receiving UHDTV data through multiple channels in accordance with an embodiment of the present invention.

FIG. 9 is a flowchart illustrating a method of the broadcasting reception apparatus receiving UHDTV data through multiple channels in accordance with an embodiment of the present invention. In FIG. 9, it is assumed that the broadcasting reception apparatus 200 includes the demodulators $210_1$ to $210_5$ and the five modulators $120_1$ to $120_5$ as shown in FIG. 1, UHDTV data is transmitted through the 47 output packets PP1 to PP47 to which the pre-headers have been applied, and the output packets PP1 to PP47 are restored into the 46 input packets P1 to P46.

Referring to FIGS. 1, 3, and 9, the demodulators $210_1$ to $210_5$ of the broadcasting reception apparatus 200 in accordance with an embodiment of the present invention receive the 47 output packets PP1 to PP47 transferred through the channels ch1-ch5 at step S200. The demodulators $210_1$ to $210_5$ transfer the output packets PP1 to PP47 to the multiplexing unit 220.

When the output packets PP1 to PP47 are received from the demodulators $210_1$ to $210_5$, the packet determination unit 221 of the multiplexing unit 220 determines whether or not a value of the packet identifier field 450, 550 in each pre-header of the output packets PP1 to PP47 is a pre-arranged value at step S210.

If, as a result of the determination at step S210, it is determined that a value of the packet identifier field 450, 550 in each pre-header of the output packets PP1 to PP47 is not a pre-arranged value, the packet error determination unit 222 considers the output packets to be packets transferred from another program and does not transfer the output packets.

Meanwhile, if, as a result of the determination at step S210, it is determined that a value of the packet identifier field 450, 550 in each pre-header of the output packets PP1 to PP47 is a pre-arranged value, the packet error determination unit 222 determines whether or not a transport error has occurred because a value of the transport error indicator field 440, 540 in each pre-header of the output packets PP1 to PP47 becomes '0' at step S220.

If, as a result of the determination at step S220, it is determined that a transport error has not occurred in the output packets PP1 to PP47, the packet restoration unit 223 detects values of the packet number fields 460 and 560 and a value of the time stamp field 470 in the pre-headers of the output packets PP1 to PP47 at step S230.

The packet restoration unit 223 rearranges the output packets PP1 to PP47, transferred to the channels ch1-ch5, using the values of the packet number fields 460 and 560 of the output packets PP1 to PP47 at step S240. The packet restoration unit 223 generates the 46 input packets P1 to P46 transferred from the broadcasting transmission apparatus 100, that is, the restoration packets P1 to P46, using the rearranged output packets PP1 to PP47 at step S250.

After generating the restoration packets P1 to P46, the output synchronization unit 224 performs output timing synchronization between the restoration packets to be provided from the broadcasting transmission apparatus 100 using the value of the time stamp field 470 of a corresponding restoration packet at step S260.

Meanwhile, if, as a result of the determination at step S220, it is determined that a transport error has occurred in the output packets PP1 to PP47, the packet error determination unit 222 neglects an output packet having a transport error.

In accordance with the demultiplexing apparatus, the multiplexing apparatus, and the multi-channel transmission and reception method using the same, in order to rearrange MPEG-2 TS packets transmitted through multiple channels not one channel due to a limited physical transport capacity of a transport channel and to minimize transmission jitter between the MPEG-2 TS packets, a pre-header including a field for multi-channel transmission is added to the MPEG-2

TS packet and the MPEG-2 TS packets are transferred. Accordingly, the MPEG-2 TS packets can be rearranged as original, and output timing between the MPEG-2 TS packets can be synchronized. As a result, a large amount of multimedia data, such as UHDTV data, can be transmitted, and realistic broadcasting service having high quality can be provided.

Although some embodiments of the present invention have been described with reference to the accompanying drawings, it is not intended to limit the scope of the present invention, and a person having ordinary skill in the art may modify the present invention in various forms within the spirit and scope of the present invention determined by the claims.

What is claimed is:

1. A demultiplexing apparatus, comprising:
   a processor capable of performing operations comprising:
   separating a broadcasting data stream into N input packets;
   generating (N+1) output packets by connecting first and second pre-headers, each of which comprises a field for multi-channel transmission, with the N input packets; and
   distributing the (N+1) output packets over at least two channels,
   wherein generating the (N+1) output packets comprises generating output packets, placed up to an $N^{th}$ position in the (N+1) output packets, using the first pre-header, and generating an $(N+1)^{th}$ output packet using the second pre-header.

2. The demultiplexing apparatus of claim 1, wherein:
   the first pre-header comprises a packet number field comprising information for packet rearrangement and a time stamp field comprising information for output timing synchronization between packets, and
   the second pre-header comprises a packet number field.

3. The demultiplexing apparatus of claim 2, wherein each of the first and second pre-headers further comprises a sync byte field, a transport error indicator field, a payload unit start indicator field, a transport priority field, and a packet identifier field.

4. The demultiplexing apparatus of claim 1, wherein generating the (N+1) output packets comprises:
   generating a first output packet by connecting the first pre-header with a first input region of an $i^{th}$ input packet (i=1) of the N input packets; and
   generating an $(i+1)^{th}$ output packet by connecting a first input region of the $(i+1)^{th}$ input packet with a second input region connected subsequently to the first input region of the $i^{th}$ input packet ($1 \leq i < N$) of the N input packets and then connecting the first pre-header with the connected result.

5. The demultiplexing apparatus of claim 1, wherein generating the (N+1) output packets comprises generating the $(N+1)^{th}$ output packet by connecting the second pre-header with a second input region connected subsequently to a first input region of an $i^{th}$ input packet (i=N) of the N input packets.

6. The demultiplexing apparatus of claim 1, wherein distributing the (N+1) output packets comprises distributing the (N+1) output packets over modulators corresponding to the respective at least two channels.

7. A multi-channel transmission method of a demultiplexing apparatus, comprising:
   separating a broadcasting data stream into N input packets;
   generating (N+1) output packets by connecting first and second pre-headers, headers, each of which comprises a field for multi-channel transmission, with the N input packets; and
   distributing the (N+1) output packets over at least two channels,
   wherein generating the (N+1) output packets comprises:
   generating output packets, placed up to an $N^{th}$ position in the (N+1) output packets, using the first pre-header; and
   generating an $(N+1)^{th}$ output packet using the second pre-header.

8. The multi-channel transmission method of claim 7, wherein:
   the first pre-header comprises a packet number field comprising information for packet rearrangement and a time stamp field comprising information for output timing synchronization between packets, and
   the second pre-header comprises a packet number field.

9. The multi-channel transmission method of claim 7, wherein generating the output packets comprises:
   generating a first output packet by connecting the first pre-header with a first input region of an $i^{th}$ input packet (i=1) of the N input packets; and
   generating an $(i+1)^{th}$ output packet by connecting a first input region of the $(i+1)^{th}$ input packet with a second input region connected subsequently to the first input region of the $i^{th}$ input packet ($1 \leq i < N$) of the N input packets and then connecting the first pre-header with the connected result.

10. The multi-channel transmission method of claim 7, wherein generating the $(N+1)^{th}$ output packet using the second pre-header comprises generating the $(N+1)^{th}$ output packet by connecting the second pre-header with a second input region connected subsequently to a first input region of an $i^{th}$ input packet (i=N) of the N input packets.

11. A multiplexing apparatus, comprising:
    a processor capable of performing operations comprising:
    detecting first field information for restoration and second field information for synchronization from each of pre-headers included in (N+1) output packets received through at least two channels;
    rearranging the (N+1) output packets received through the at least two channels using the first field information; and
    generating N restoration packets using the first field information; and
    performing output timing synchronization between the N restoration packets using the second field information.

12. The multiplexing apparatus of claim 11, wherein:
    the first field information is a value of a packet number field comprising information for packet rearrangement, and
    the second field information is a value of a time stamp field for output timing synchronization between packets.

13. The multiplexing apparatus of claim 11, wherein generating the N restoration packets comprises:
    generating a first restoration packet by connecting a first output region of an output packet having the first field information of i (i=1), from among the (N+1) output packets, with a first output region of an output packet having the first field information of (i+1) and connecting a sync byte field with the connection results; and
    generating an $i^{th}$ restoration packet by connecting a second output region connected to a first output region of an output packet having the first field information of i ($1 < i < (N+1)$), from among the (N+1) output packets, with the first output region of the output packet having the first field information of (i+1) and connecting a sync byte field with the connection results.

14. A multi-channel reception method of a multiplexing apparatus, comprising:
receiving (N+1) output packets through at least two channels;
detecting first field information for restoration and second field information for synchronization from each of pre-headers included in the (N+1) output packets;
generating N restoration packets using the first field information; and
performing output timing synchronization between the N restoration packets using the second field information,
wherein generating the N restoration packets using the first field information comprises rearranging the (N+1) output packets received through the at least two channels using the first field information.

15. The multi-channel reception method of claim 14, wherein:
the first field information is a value of a packet number field comprising information for packet rearrangement, and the second field information is a value of a time stamp field for output timing synchronization between packets.

16. The multi-channel reception method of claim 14, wherein generating the N restoration packets using the first field information comprises:
generating a first restoration packet by connecting a first output region of an output packet having the first field information of i (i=1), from among the (N+1) output packets, with a first output region of an output packet having the first field information of (i+1) and connecting a sync byte field with the connection results; and
generating an $i^{th}$ restoration packet by connecting a second output region connected to a first output region of an output packet having the first field information of i (1<i< (N+1)), from among the (N+1) output packets, with the first output region of the output packet having the first field information of (i+1) and connecting a sync byte field with the connection results.

* * * * *